United States Patent [19]
Kapp et al.

[11] Patent Number: 5,949,348
[45] Date of Patent: Sep. 7, 1999

[54] METHOD AND APPARATUS FOR VARIABLE KEYBOARD DISPLAY

[75] Inventors: Michael A. Kapp, Alpharetta, Ga.; Floyd Jones, Greenford, United Kingdom; Tom Donnelly, Louisville, Ohio; David A. Ellis, Columbus, Ohio; David M. Allgeier, New Concord, Ohio; Robert L. Protheroe, Lawrenceville, Ga.

[73] Assignee: NCR Corporation, Dayton, Ohio

[21] Appl. No.: 08/233,546

[22] Filed: Apr. 26, 1994

Related U.S. Application Data

[63] Continuation of application No. 07/930,964, Aug. 17, 1992, abandoned.

[51] Int. Cl.$^6$ .................................................. G06F 17/00
[52] U.S. Cl. .............................. 340/825.31; 340/825.34; 341/23; 707/500
[58] Field of Search .................. 340/825.31, 825.34; 341/23; 235/375, 380; 178/18; 382/3

[56] References Cited

U.S. PATENT DOCUMENTS

| | | | |
|---|---|---|---|
| 4,479,112 | 10/1984 | Hirsch | 340/365 VL |
| 4,567,480 | 1/1986 | Blanchard | 340/712 |
| 4,672,677 | 6/1987 | Yamakawa | 382/13 |
| 4,752,965 | 6/1988 | Dunkley et al. | 382/3 |
| 4,857,914 | 8/1989 | Thrower | 340/825.31 |
| 4,962,530 | 10/1990 | Cairns | 340/825.31 |
| 4,970,655 | 11/1990 | Winn et al. | 364/479 |
| 4,972,496 | 11/1990 | Sklarew | 382/13 |
| 5,008,847 | 4/1991 | Lapeyre | 364/729.16 |
| 5,025,255 | 6/1991 | Mould | 341/26 |
| 5,050,116 | 9/1991 | Stahnke | 364/709.15 |
| 5,161,190 | 11/1992 | Cairns | 380/23 |

OTHER PUBLICATIONS

U.S. Patent Application Serial No. 07/575,096, filed Aug. 30, 1990, inventors David M. Allgeier et al. for Write Input Transaction Apparatus and Method.

Robert Cowart, Mastering Windows 3.1, Special Edition, 1993, pp. 16–17, 418–419.

*Primary Examiner*—Wayne Amsbury
*Assistant Examiner*—David Yiuk Jung
*Attorney, Agent, or Firm*—Albert L. Sessler, Jr.

[57] ABSTRACT

A method and apparatus for providing and using a variable format, configuration and location keyboard image which enables a digitizing device to present a different keyboard configuration and/or location to each user so that detection by an unauthorized viewer of a personal identification number (PIN) or other secret identification number during entry will become significantly more difficult. The presentation may include a random or scrambled keyboard entry image for each customer, and a single or set of customer preselected images that will be tied to the customer's account number which is read from the magnetic strip on a personal card. In addition to the keyboard, the device provides a single write surface for capturing a signature entry so that the two security features are incorporated in a single device.

7 Claims, 7 Drawing Sheets

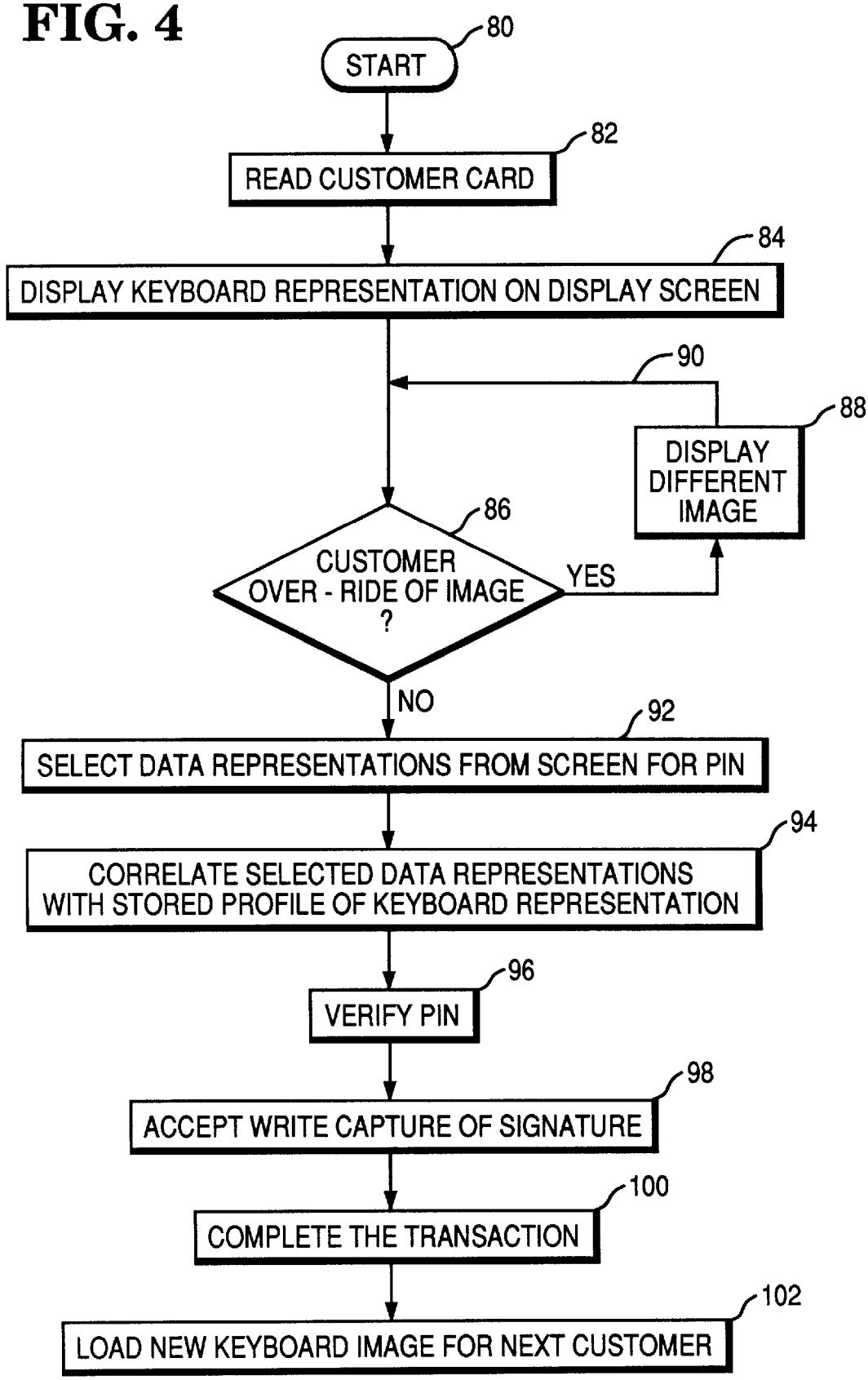

METHOD AND APPARATUS FOR VARIABLE KEYBOARD DISPLAY

This application is a continuation of application Ser. No. 07/930,964, filed Aug. 17, 1992 now abandoned.

BACKGROUND OF THE INVENTION

The present invention relates to a method and apparatus for variable keyboard display, and more particularly relates to a method and apparatus for providing keyboard entry means which is protected from detection of entered data by an unauthorized observer.

Many systems employed in business establishments include customer-activated and operated devices or business terminals, such as automated teller terminals, for example. In such systems, it is extremely important that the customer provide adequate identification in a form that can be accepted and verified by the business terminal or the system with which it is associated, since in an automated system, there is no employee of the business establishment on hand to personally examine the credentials of the customer, and thereby identify him or her.

One solution to this problem of identification by machine has been the use of a unique personal identification number, or PIN, which a customer can enter into a keypad or keyboard associated with the terminal and thus establish his or her identity. One problem with this solution is that an unauthorized observer watching from a distance may be able to ascertain the PIN number for a customer by knowing the standard keyboard configuration and closely watching the hand and finger movements of the customer in order to ascertain which keys are being depressed.

It would accordingly be helpful from a security standpoint if it were possible to defeat the efforts of an unauthorized observer to ascertain from a distance the PIN number being entered. It would also be helpful if an additional identification means, such as signature identification, were provided, so as to further minimize the likelihood that an unauthorized person could be improperly recognized by the terminal as a legitimate customer.

SUMMARY OF THE INVENTION

The present invention comprises a method and apparatus for providing and using a variable format, configuration and location keyboard image which enables a digitizing device to present a different keyboard configuration and location to each user so that detection by an unauthorized observer of a personal identification number during entry will be significantly more difficult. In addition, the device enables the entry of a customer signature for further identification checking.

In accordance with one aspect of the present invention, a process for providing keyboard data entry which is protected from detection by an unauthorized observer, comprises the following steps: (a) providing a combined touch screen and display on which a chosen one of a plurality of keyboard representations may be displayed, with certain areas of the display representing certain keyboard values; (b) providing a particular keyboard configuration on the display; and (c) entering data into the combined touch screen and display by contacting selected areas of the configuration on the screen on which data representations appear.

In accordance with another aspect of the present invention, a process for enhancing security with respect to identification of a user of a business terminal in a system, comprises the following steps: (a) providing a combined touch screen and display on which a chosen one of a plurality of keyboard representations may be displayed, with certain areas of the display representing certain keyboard values; (b) providing a particular keyboard configuration on the display; (c) entering personal identification data into the combined touch screen and display by contacting selected areas of the configuration on the screen on which data representations appear; (d) erasing the screen; (e) entering a user signature on the screen; and (f) verifying the identity of the user of the business terminal by comparison of the personal identification data and the signature with corresponding data contained in the system.

In accordance with another aspect of the present invention, a user activated terminal for the entry of transaction-related data comprises: a housing for the terminal; a digitizer capable of sensing and decoding data input into the digitizer by a user; display means for displaying a representation of a keyboard to a user of the digitizer; and data processing means coupled to the digitizer and to the display for causing data input to the digitizer to be optionally displayed on the display, said data processing means including memory means for providing a plurality of different keyboard configurations to be displayed one at a time on the display, said data processing means also being capable of determining the values of data input by a user into the digitizer in accordance with the particular keyboard representation then displayed on the display.

In accordance with another aspect of the present invention, a system for processing transactions comprises: a user input device which includes display means having a keyboard representation appearing thereon and a digitizer for direct entry of data into the user input device by contacting areas of the digitizer corresponding to depictions of specific keys of said keyboard representations by a user; a business terminal on which item transactions can be entered and recorded; means coupling said terminal to said user input device; and a controller operatively coupled to said terminal, to said display means of said write input device, and to said digitizer of said user input device, said controller including memory means for storing a plurality of keyboard representations which can be displayed one at a time on said display means, means for determining the values of data input by a user into the digitizer in accordance with the particular keyboard configuration then displayed on the display means, and means for transmitting said determined values of data to said terminal.

In accordance with another aspect of the present invention, a process for providing keyboard entry data which is protected from detection by an unauthorized observer, comprises the following steps: (a) providing a combined touch screen and display on which a keyboard configuration may be displayed in one of a plurality of display locations; (b) providing a selected location for the keyboard configuration on the display; and (c) entering data into the combined touch screen and display by contacting selected areas of the displayed keyboard configuration on the screen on which data representations appear.

In accordance with another aspect of the present invention, a process for enhancing security with respect to identification of a user of a business terminal in a system, comprises the following steps: (a) providing a combined touch screen and display on which a keyboard configuration may be displayed in one of a plurality of display locations, with certain areas of the display representing certain keyboard values; (b) providing a selected location for the keyboard configuration on the display; (c) entering personal identification data into the combined touch screen and display by contacting selected areas of the displayed keyboard configuration on the screen on which data representations appear; (d) providing an area for entry of a user signature on the screen; (e) entering a user signature on the screen; and (f) verifying the identity of the user of the business terminal by comparison of the personal identification data and the signature with corresponding data contained in the system.

In accordance with another aspect of the present invention, a user activated terminal for the entry of transaction-related data comprises: a housing for the terminal; a digitizer capable of sensing and decoding data input to the digitizer by a user; a display for displaying a representation of a keyboard to a user of the digitizer; and data processing means coupled to the digitizer and to the display for causing data input to the digitizer to be optionally displayed on the display, said data processing means being capable of displaying a keyboard configuration in one of a plurality of display locations, said data processing means also being capable of determining the values of the data input by a user into the digitizer in accordance with the keyboard configuration then displayed on the display.

In accordance with another aspect of the present invention, a system for processing transactions comprises: a user input device which includes a display having a keyboard representation appearing thereon and a digitizer for direct entry of data into the user input device by inputting to areas of the digitizer corresponding to depictions of specific keys of said keyboard representation by a user; a business terminal on which item transactions can be entered and recorded; means for coupling said terminal to said user input device; and a controller operatively coupled to said terminal, to said display of said user input device, and to said digitizer of said user input device, said controller being capable of displaying a keyboard configuration in a plurality of locations on said display, and including means for determining the values of data input by a user into the digitizer in accordance with a selected keyboard configuration location then displayed on the display, and means for transmitting said determined values of data to said terminal.

It is accordingly an object of the present invention to provide a process for keyboard data entry which is protected from detection by an unauthorized observer.

It is another object of the present invention to provide a process for enhancing security with respect to identification of a user of a business terminal in a system.

Another object of the present invention is to provide a user activated terminal for the entry of transaction-related data.

Another object of the present invention is to provide a system for processing security-related transactions.

Another object of the present invention is to provide a method and apparatus for sequentially displaying a plurality of different keyboard representations in a data entry device for successive data entry transactions.

Another object of the present invention is to provide a method and apparatus for displaying a keyboard representation in a plurality of different locations on the display of a data entry device.

Another object of the present invention is to provide a method and apparatus for entry of both numerical identification information and signature identification information in a single device.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 4 is a flow diagram of a customer transaction which includes the entering of PIN and signature data.

DETAILED DESCRIPTION

The present invention may be implemented by use of a write input or user input device which combines a display visible to a user with a digitizer or touch screen through which the entry of data by a user may be made.

Figure 1:
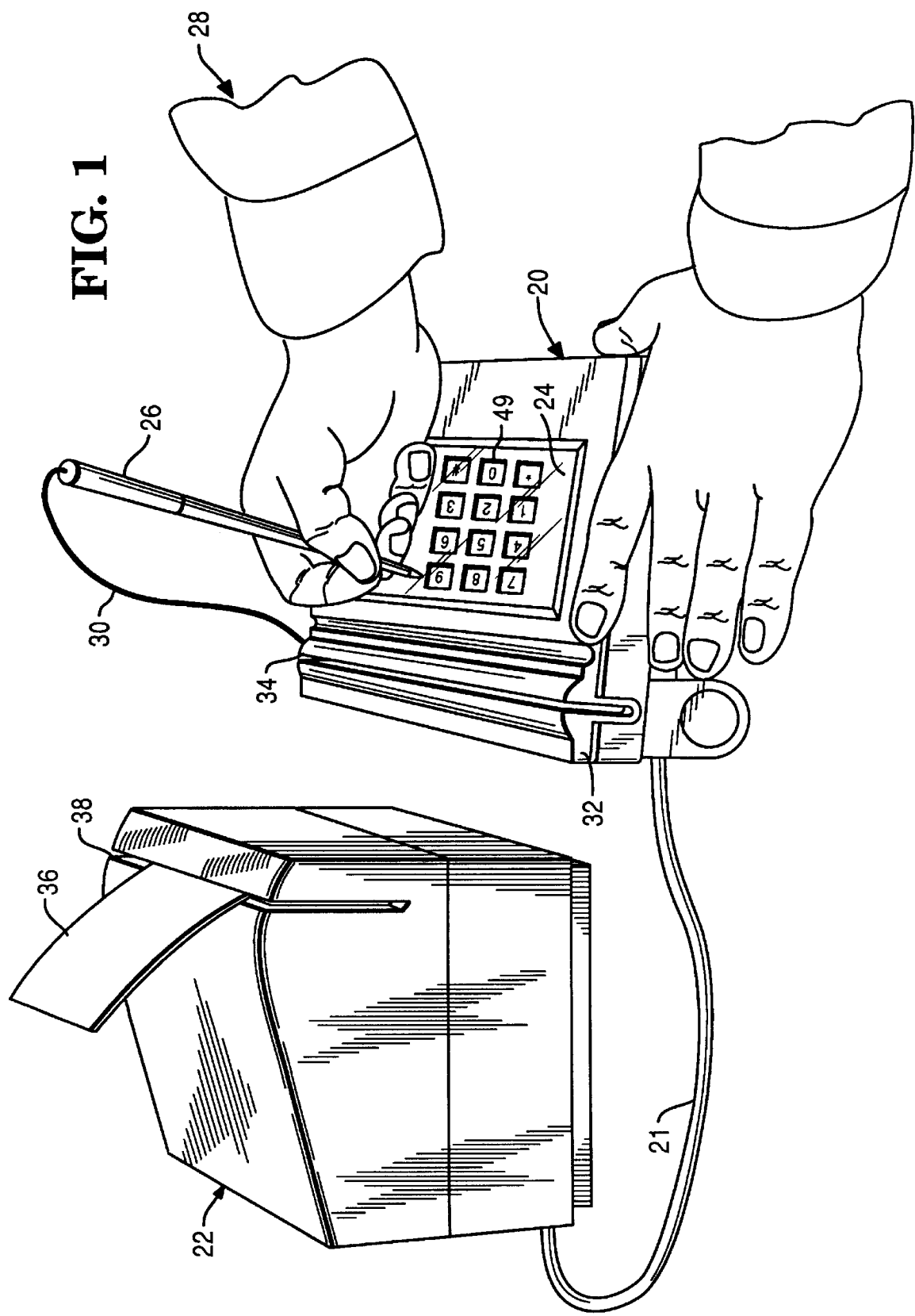
FIG. 1 is a perspective view of a write input apparatus and associated printer which may be employed in the present invention.

Referring now to FIG. 1, shown there is a perspective view of a suitable write input apparatus 20 which is coupled to a printer 22 by a connector 21. Although this is shown as a direct connection or coupling, the actual coupling or connection may actually extend through one or more other devices, such as a controller, as will be subsequently be described. The write input device includes a transparent surface 24 through which information may be displayed and on which information may be entered by writing thereon with a stylus 26 by a human operator 28. The stylus 26 is connected to the apparatus by an electrically conductive line 30. The apparatus 20 may also include an integral magnetic stripe reader 32 having a slot 34 through which a card bearing magnetic indicia may be swiped so that the data contained thereon can be inputted by, stored in and used by the system which includes the write input apparatus 20 and the printer 22. The write input device 20 can be configured without the magnetic stripe reader 32, if desired, in the event that the system which includes the apparatus does not require a reader, or incorporates a separate reader. The write capture apparatus 20 may also be equipped with an integrated circuit card reader (not shown) which would serve the same data input purpose as the magnetic reader.

The printer 22 will most commonly be used for printing customer receipts such as the receipt 36 which is shown as issuing from an aperture 38 in the housing of the printer. Other types of record media could also be generated by the printer 22, if desired, in response to the needs of the system. Any suitable printer may be employed, such as an Epson RP265, made by Epson America, Inc., Torrance, Calif.

Figure 2:
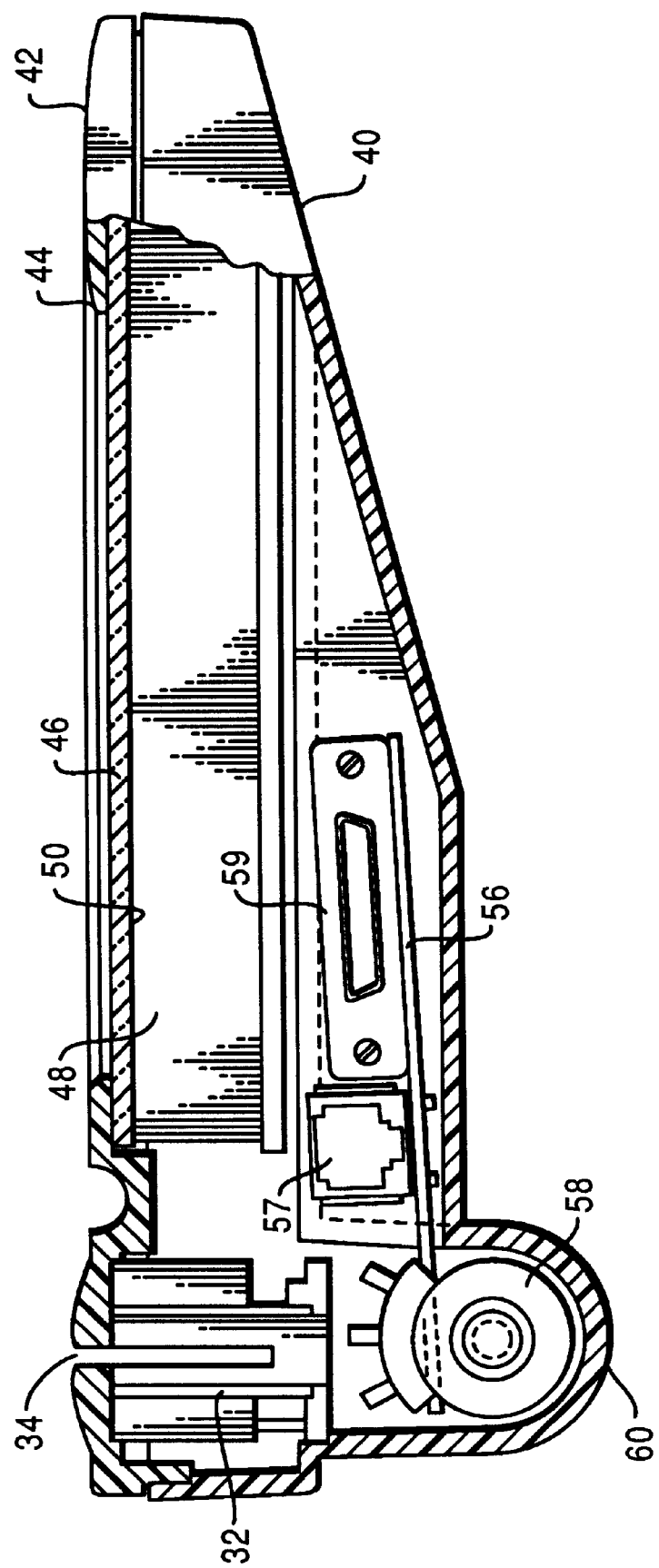
FIG. 2 is a sectional elevational view of the write input apparatus of FIG. 1.

As shown in the sectional view of FIG. 2, the write input apparatus 20 is contained within a lower housing 40 and an upper housing 42, which mate along the edges thereof. The upper housing 42 contains an aperture 44 within which is placed a transparent interactive digitizer element 46 which is capable of generating electrical signals which represent the position of the stylus 26 or other device placed in contact therewith. Broadly speaking, during operation of the interactive element 46, the stylus 26 acts as a probe and the differing potentials between sides of the element, in two coordinate directions, are measured, converted into digital form, and are processed through correction algorithms. This enables a trace of the movement of the stylus to be captured and retained, as well as displayed on a liquid crystal display (LCD) module 48. Interactive elements of this type are commercially available, and one such device which can be employed in the present invention is the Screenwriter controller/digitizer/pen marketed by MicroTouch Systems Inc., Wilmington, Mass.

Positioned directly beneath the interactive transparent element 46 and having a display screen visible therethrough is the liquid crystal display (LCD) module 48 which is capable of displaying information such as a keyboard representation 49 (FIG. 1) in response to electrical signals applied thereto. Information from a card that has been read by the magnetic stripe reader 32 can be used to enter information into the LCD module 48. Electrical signals from the interactive element 46 relating to movement of the stylus 26 on the element can then be applied to the LCD module 48 to provide a representation of a signature on the receipt form. Thus, since the LCD module 48 is positioned directly beneath the transparent digitizer element 46, the movements of the stylus 26 on the transparent surface 24 are graphically captured and are immediately visible at the points of contact of the stylus with the surface. A display screen 50 forms part of the top surface of the module. LCD modules of this type are commercially available, and one such module which can be employed in the present invention is Model EG7500, marketed by Epson America, Inc., Torrance, Calif.

Figure 3:
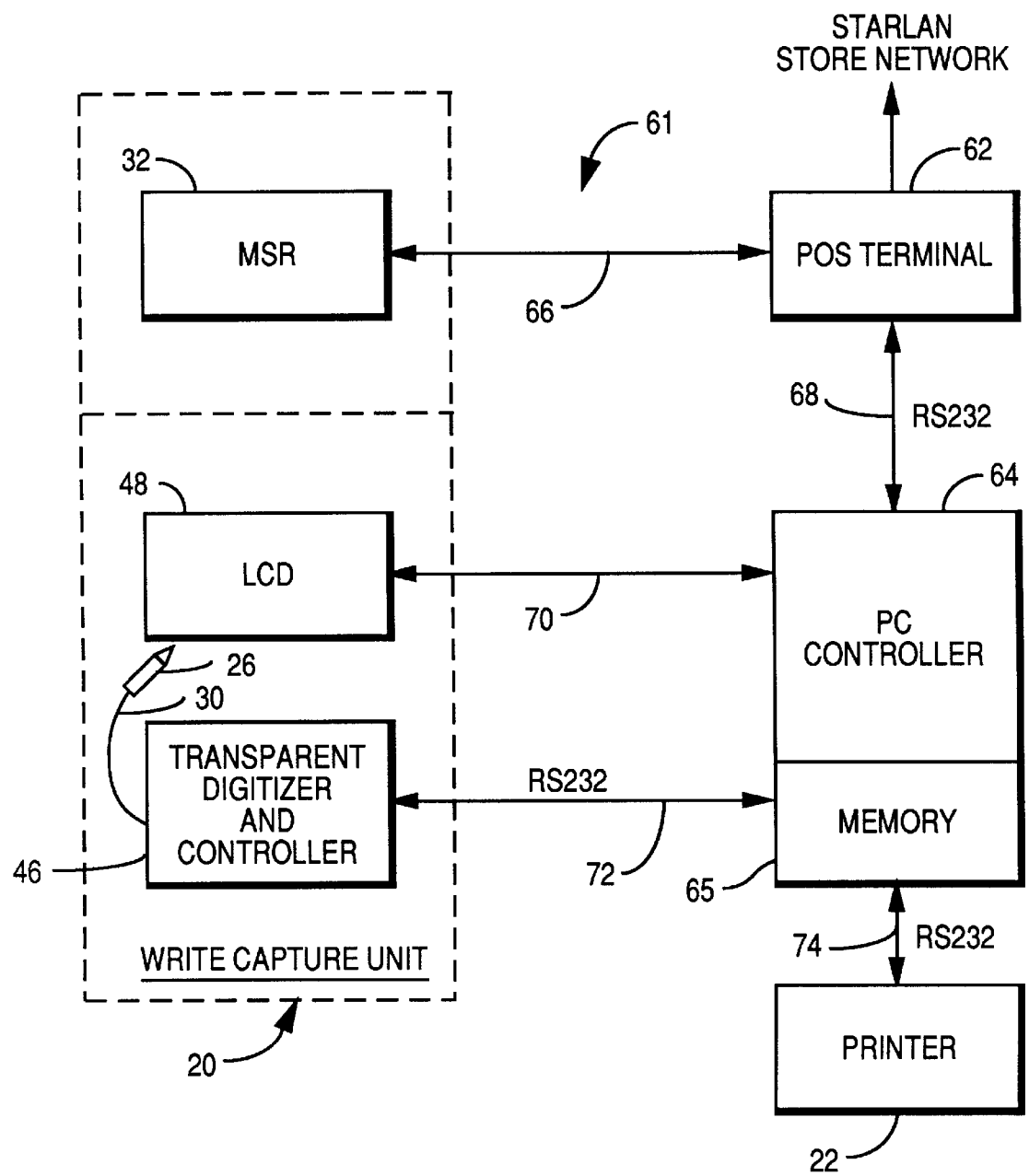
FIG. 3 is a block diagram of a system which includes the write input apparatus.
Figure 6:
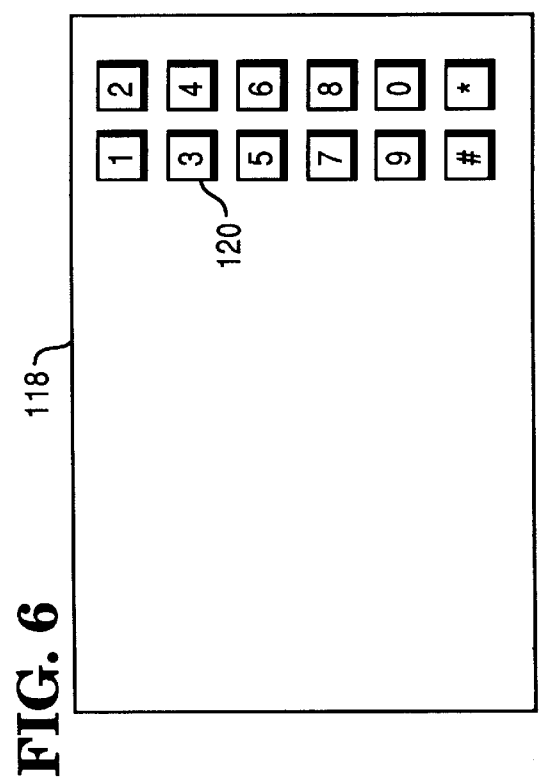
FIGS. 5 to 16 inclusive show various keyboard configurations which may be employed in the implementation of the present invention.

The magnetic stripe reader 32 and its slot 34 are shown to be located in the upper left portion of the apparatus 20, as viewed in FIG. 2. A control circuit board 56 which functions as a controller for the transparent digitizer element 46 is located below the LCD module 48 in the lower housing 40 of the apparatus 20 and includes a connector 57 for connection to the digitizer element 46 and also includes an RS232 connector 59 to a PC controller 64 (FIG. 3). A contrast control 58 for changing the contrast of the screen 50 of the LCD module 48 is located in a semi-cylindrical lower extension 60 of the lower housing 40, which extension also serves as a foot or support for supporting the apparatus 20 on a work surface.

FIG. 3 is a block diagram of a system 61 which includes the write input apparatus 20 and the printer 22, in addition to the magnetic stripe reader 32, a point of sale (POS) terminal 62 and a personal computer functioning as a controller 64. The controller 64 contains a memory 65, which includes memory space for storing a plurality of different keyboard representations, which may be displayed on the display 48, as will subsequently be described in greater detail. The keyboard representation 49 is shown in FIG. 1 as being displayed on the display 48, and the individual key representations thereof can be selected by engaging the stylus 26 with the digitizer element 46. If desired, a digitizer could be selected so that individual key representations are selected by use of a finger in place of the stylus 26.

The write input apparatus 20 is shown in block form in phantom lines, and includes the LCD module 48 and the interactive digitizer element and controller 46, with associated stylus 26. The magnetic stripe reader 32 is shown in a separate phantom line block, to indicate that it may be a separate free-standing device, rather than being integrated into the housing of the write input apparatus 20, if desired. The POS terminal 62 can be any suitable device of that type, such as a Class 7052 terminal, marketed by NCR Corporation, Dayton, Ohio. The personal computer 64 which functions as a controller may be any suitable personal computer, such as a Model PC 810, marketed by NCR Corporation, Dayton, Ohio. A Display Master model YDM6420 graphics adapter, marketed by Yamaha Corporation of America, San Jose, Calif., is incorporated into the controller 64, and functions to drive the LCD module 48. An NCR Corporation part number 017-0035367B RS 232 adaptor board adds required additional serial ports for communications.

The magnetic stripe reader 32 is connected via a path 66 to the POS terminal 62, which is in turn connected by an RS232 data bus 68 to the PC controller 64. The LCD display 48 is connected via a path 70 to the PC controller 64, and in effect takes the place of the CRT display which would normally be associated with the PC. The touch screen and controller 46 is connected to the PC controller 64 by an RS232 data bus 72, and a similar RS232 data bus 74 connects the PC controller 64 to the printer 22. The POS terminal 62 may be connected to other data processing facilities in an establishment in which it is used, such as a STARLAN store network.

For a more detailed description of the write input apparatus 20, reference may be had to U.S. patent application Ser. No. 575,096, filed Aug. 30, 1990, inventors David M. Allgeier et al., for "Write Input Transaction Apparatus and Method", assigned to the assignee of the present application, and incorporated herein by reference.

The present invention enhances the utility and versatility of the write input apparatus 20 by adding means to provide keyboard images on the display having variable formats, configurations and locations. Usefulness is also enhanced by enabling two security procedures to be performed using a single device: first, the safeguarded entry of numerical identification information, such as a PIN, and, second, the entry of a signature to provide signature identification information.

Variable format configuration keyboard images and locations (VFCKIL) enables a write input apparatus to present a different keyboard configuration and location to each user so that detection of a PIN or other secret identification number during entry becomes significantly more difficult. The presentation of a different keyboard configuration and location image includes a number of different capabilities.

First, a random or scrambled keyboard entry image can be presented to each customer. Second, presentation of a single keyboard image or a set of customer preselected keyboard entry images can be tied to a customer's account number which is read from the magnetic stripe of a customer's personal card. Third, a customer selectable override can be provided to enable use of a standard keyboard format, or some other preferred keyboard format, or a scrambled or security format keyboard entry image at the time of a transaction. Fourth, a single write surface is provided for the capture of a PIN or other secret identification number input and an entry of a customer signature so that two security features are incorporated in a single device.

Detection of PINs or other secret identification numbers by unauthorized observers is made easier by the fixed format keyboards in general use today. The three row by three column keyboard (with zero added) has only two basic formats, so that the information "upper left, upper center, upper right, lower left, lower center and lower right" can often be detected by observation of the hand positions and movements of a user, and can then be translated into the correct PIN or other secret identification data which has just been entered into such a keyboard.

The VFCKIL system described herein assumes all of the control functions currently assigned to keypads. It provides additional flexibility over the fixed format devices Shown in FIG. 4 is a flow diagram which illustrates the process of completing the security phase of a transaction in accordance with the present invention. The process commences with the "start" block 80, and a customer card, such as a credit card bearing a magnetic stripe, is first read, using the MSR 32, as represented in block 82. Next, a keyboard image, having numerical digits from 0 to 9 (plus "enter" and "cancel") in a predetermined sequence and location, is displayed on the display 48. This image is selected from the keyboard representations stored in the memory 65 of the controller 64, and may be selected either randomly or in accordance with a predetermined sequence by the appropriately programmed controller 64, or may be selected in accordance with the customer's identity as determined by the reading of the credit card.

The customer may then make a determination as to whether the keyboard image on the display 48 is suitable for use by that customer. If not, the customer may over-ride the image shown (block 86), in which case a different image will be displayed (block 88). This may be a particular image selected by the information contained on the customer's credit card, or may be another image chosen by the system. The process returns to block 86 via path 90 so that, if desired, the customer may again over-ride the image selection, until an image satisfactory to the customer is displayed.

The customer will then proceed to enter data into the system (block 92) by applying the stylus 26 to a selected area of the display 48 which represents a particular key value. If a suitable digitizer is used in the system, the key value representations may be selected by use of the customer's finger.

The controller 64 then proceeds to correlate the data representations which have been selected with the stored profile of the keyboard representation (block 94) in order to determine the numerical values entered by the customer. Once these values have been determined, the personal identification number (PIN) is verified (block 96). A customer signature on the digitizer 46 will then be accepted, if desired, and compared with signature reference data stored at an appropriate location in the system, to provide additional verification of the customer's identity (block 98). If only a single security check is needed, the signature step may be omitted.

All security requirements having been satisfied, the transaction may then be completed (block 100). In the case of a financial terminal, this may, for example, involve a withdrawal or a deposit. In the case of a retail terminal, this may involve, for example, a merchandise purchase. Once the transaction has been completed, the system will cause a new keyboard image or representation to be loaded in preparation for the next customer, as represented in block 102.

It will be apparent to one skilled in the art that a wide variety of images of keyboards or keypads may be employed in the present invention to enhance security and to foil unauthorized observers. In FIGS. 5 to 16 inclusive, a number of possible keyboard configurations are shown by way of example, and not by way of limitation.

Figure 5:
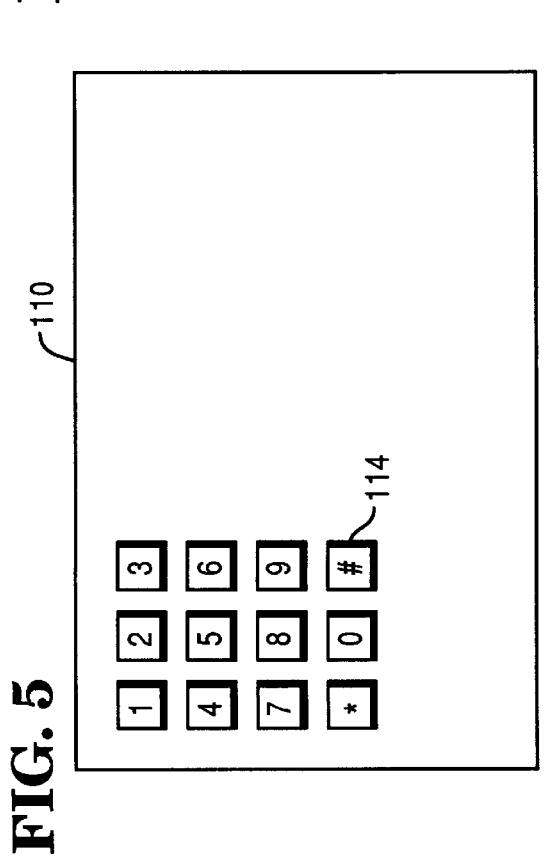
Figure 7:
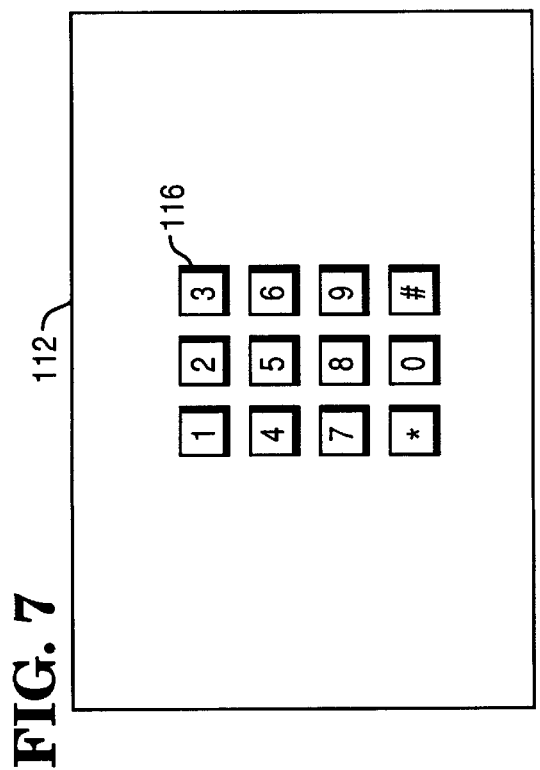
Figure 10:
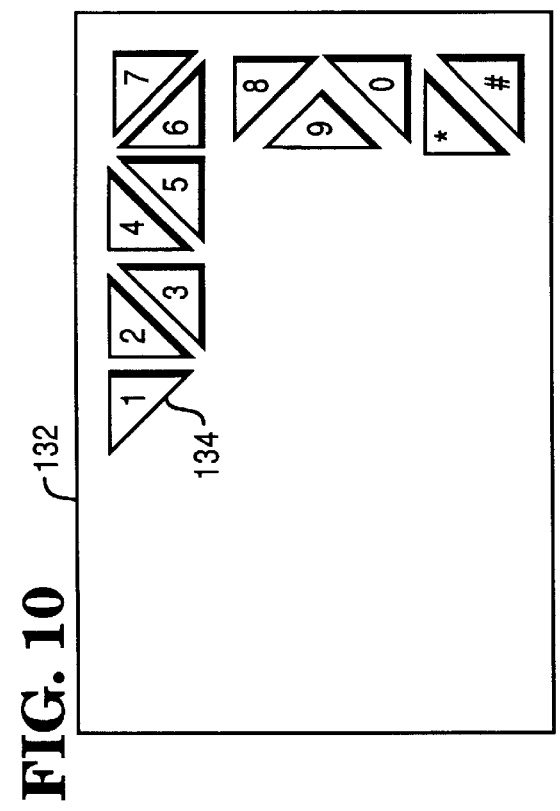
Figure 12:
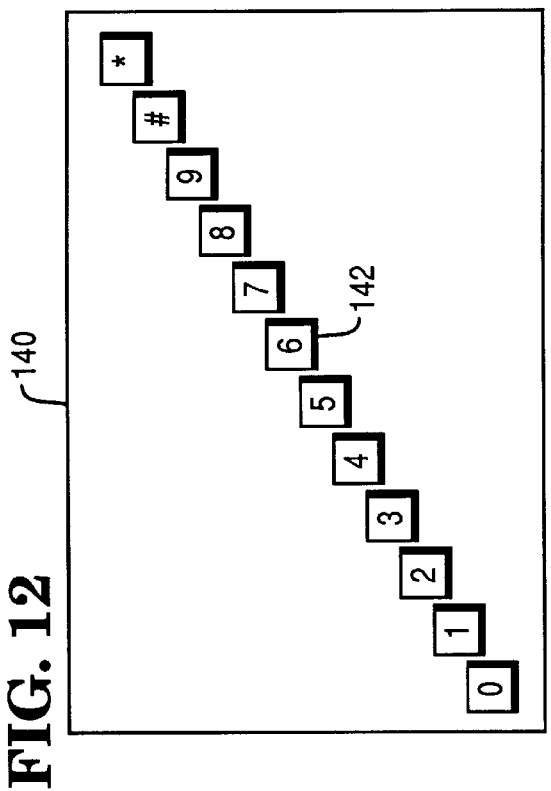

In FIGS. 5 and 7, in images 110 and 112, a standard ANSI keyboard arrangement is shown. In FIG. 5, the keyboard, comprising key representations 114, is located in the upper left corner of the screen, while in FIG. 7, the same keyboard, comprising key representations 116, is shown as being located in the central portion of the screen. Movement of the keyboard from one of these positions to the other would be confusing to an observer who is attempting to determine which keys have been operated by watching hand movements. In the screen 118 of FIG. 6, the key representations 120 are arranged in two vertical rows.

Figure 8:
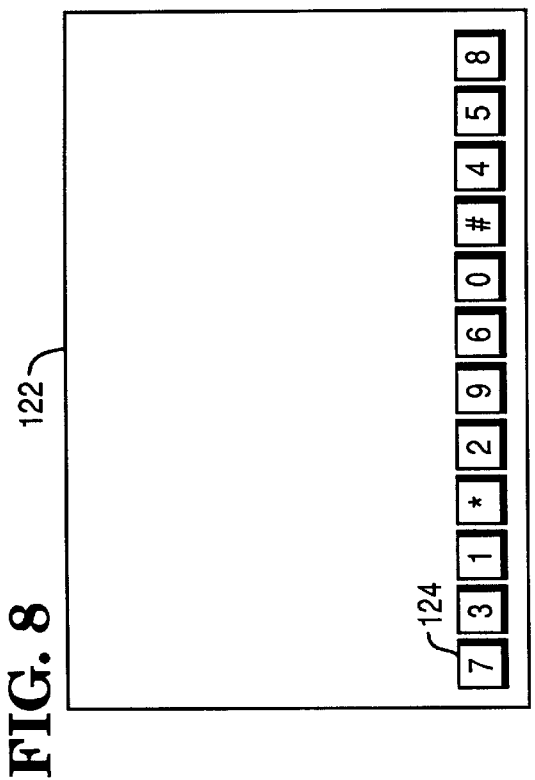

In the screen 122 of FIG. 8, the key representations 124 are arranged in a horizontal line along the bottom of the screen. Also it will be noted that while the numerical values were arranged in general numerical order in the screens of FIGS. 5, 6 and 7, the numerical values of the key representations 124 in FIG. 8 appear in a random order, which would further confuse an unauthorized observer. By the same token, a user of this keyboard arrangement would have to be fully aware and attentive in entering a PIN because of the non-standard keyboard arrangement.

Figure 9:
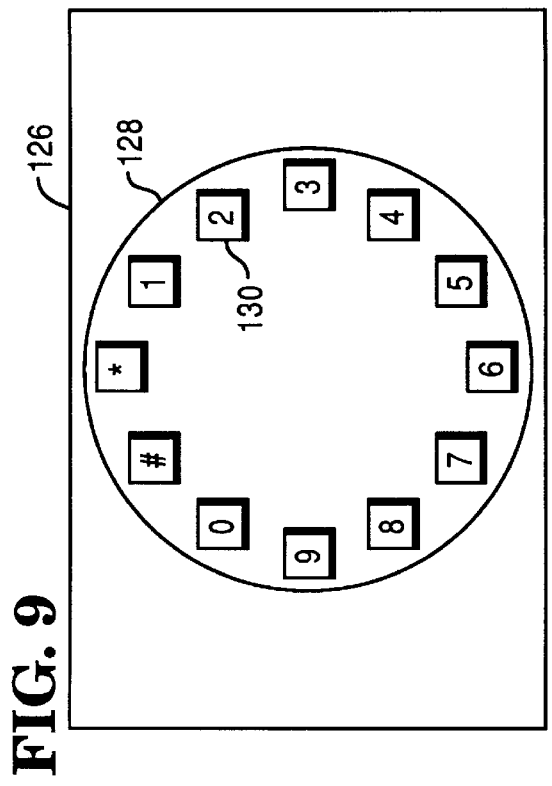
Figure 11:
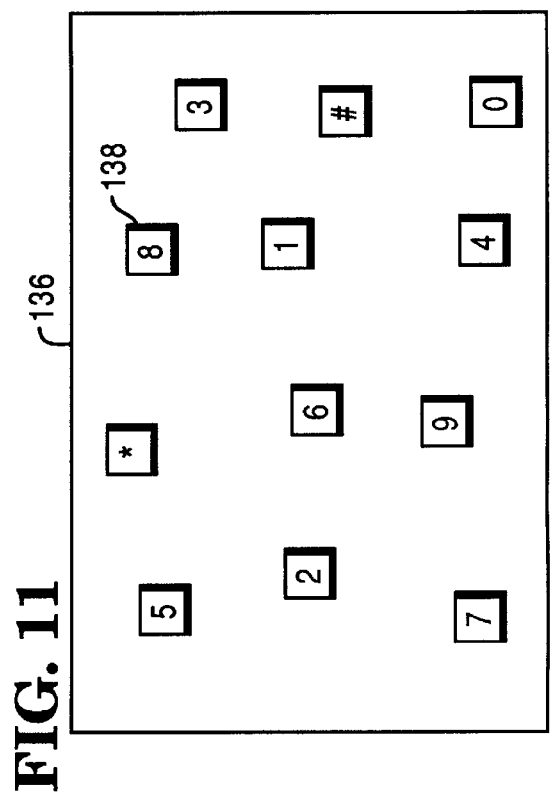
Figure 14:
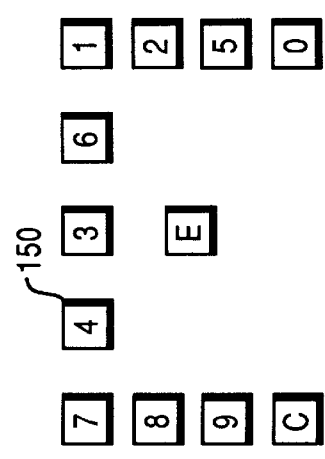
Figure 16:
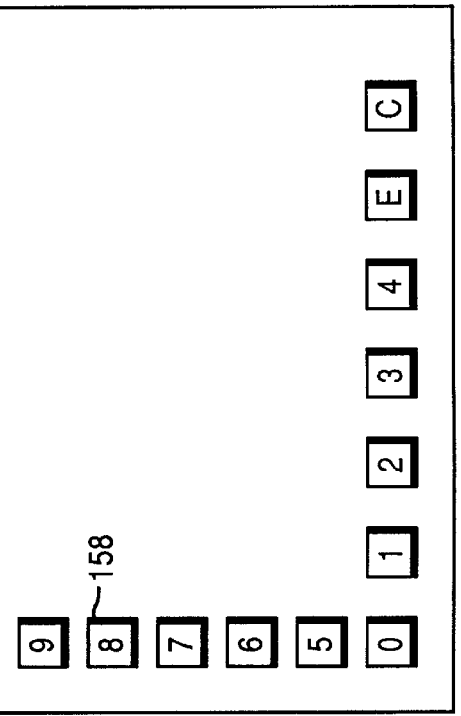

In the screen 126 of FIG. 9, the key representations 130 are arranged in the configuration of a clock face or circle 128. In the screen 132 of FIG. 10, the key representations 134 are of triangular, rather than rectangular, configuration and are arranged in an inverted "L" shape along the upper and right edges of the display screen. The use of a triangular key configuration enables the key representations to be "packed" more tightly together, thus increasing the difficulty of distinguishing one key position from another by a remote observer. In the screen 136 of FIG. 11, the key representations 138 appear in a random configuration on the screen. In the screen 140 of FIG. 12, the key representations 142 appear in a diagonal configuration across the screen.

Figure 13:
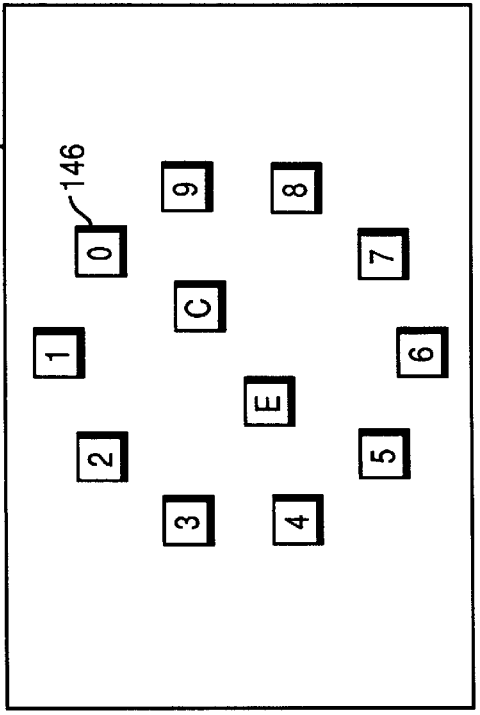
Figure 15:
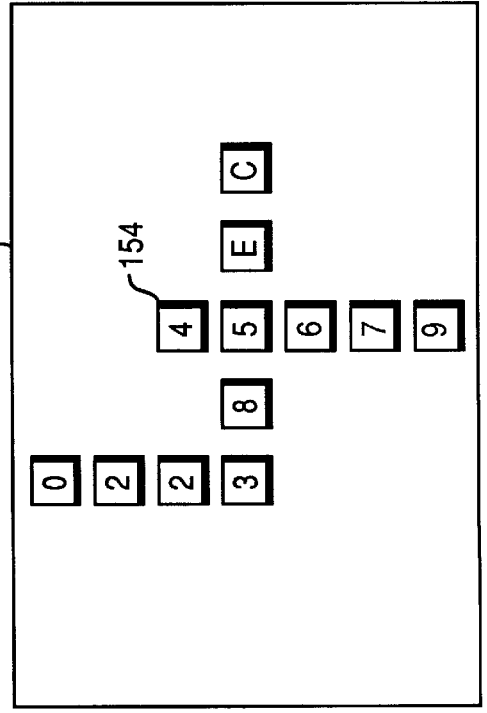

In the screen 144 of FIG. 13, the key representations 146 appear in the general configuration of a zero with crossed diagonal. In the screen 148 of FIG. 14, the key representations 150 appear in a symbolic design, somewhat similar to the letter "M". In the screen 152 of FIG. 15, the key representations 154 appear in a symbolic design, somewhat similar to the numeral "4". In the screen 156 of FIG. 16, the key representations 158 appear in connected vertical and horizontal lines, disposed along the left and bottom edges of the screen.

It will be seen from the above examples that the invention is not limited to any particular configuration representing a keyboard, and that any configuration may be employed which facilitates the concealment from an unauthorized observer of which key representation is being contacted. Formats such as those illustrated in FIGS. 5–16 identify the general position for placement of the twelve key positions. The individual numerical digits may be placed in any one of these twelve positions. These images are predefined and referenced by designators stored in the controller memory 65 for location, format and digit position within the specified format. A given location, format and position (LFP) code is output to both the display 48 and the digitizer 46 at the beginning of each new customer cycle, in order to provide the visual image and to monitor for inputs selected by the stylus 26 from the current image being displayed. The location code provides data to identify what part of the display 48 and digitizer 46 will be used to display and sense for input for the selected image. The format code identifies which of the predefined formats will be used with this image. The position code identifies which predefined numerical digit sequence will be used with this image.

While the forms of the invention shown and described herein are admirably adapted to fulfill the objects primarily stated, it is to be understood that it is not intended to confine the invention to the forms or embodiments disclosed herein, for it is susceptible of embodiment in various forms within the scope of the appended claims.

What is claimed is:

1. A process for enhancing security with respect to identification of a user of a business terminal in a system, comprising the following steps:

(a) providing a combined touch screen and display on which a chosen one of a plurality of keyboard configurations may be displayed in a chosen location on the display, with certain areas of the display representing different keyboard values at different times in accordance with the particular keyboard configuration chosen;

(b) providing a particular keyboard configuration in a chosen location on the display;

(c) entering personal identification data into the combined touch screen and display by contacting selected areas of the configuration on the combined touch screen and display on which data representations appear;

(d) providing an area for entry of a user signature on the screen;

(e) entering a user signature on the combined touch screen and display; and (f) verifying the identity of the user of the business terminal by comparison of the personal identification data and the signature with corresponding data contained in the system.

2. The process of claim 1, in which a card reader is provided, and also including the step of entering data from a user's personal card by use of the reader to select a particular one of the plurality of available keyboard configurations to over-ride the keyboard configuration provided by the system.

3. A process for enhancing security with respect to identification of a user of a business terminal in a system, comprising the following steps:

(a) providing a combined touch screen and display on which a depiction of a keyboard configuration may be moved into position to be displayed in any one of a plurality of different locations on different portions of the display, with certain different areas of the display representing certain keyboard values corresponding to the different locations of the keyboard configuration depiction;

(b) providing a selected one of said different locations for the keyboard configuration on the display;

(c) entering personal identification data into the combined touch screen and display by contacting selected ones of said certain areas of the displayed keyboard configuration on the screen;

(d) providing an area for entry of a user signature on the screen;

(e) entering a user signature on the screen; and (f) verifying the identity of the user of the business terminal by comparison of the personal identification data and the signature with corresponding data contained in the system.

4. The process of claim 3, also including the following step:

(g) changing the location of the depiction of the keyboard configuration on the display from one of said plurality of different locations to another of said different locations for a subsequent transaction which uses the combined touch screen and display.

5. A user activated terminal for the entry of transaction-related data, comprising:

a housing for the terminal;

a transparent digitizer capable of sensing and decoding data input to the digitizer by a user;

a display positioned beneath the digitizer for displaying a representation of a keyboard through the digitizer to a user of the digitizer; and data processing means coupled to the digitizer and to the display for causing data input to the digitizer to be optionally displayed on the display, said data processing means being capable of displaying any one of a plurality of selected keyboard configurations in any one of a plurality of different locations on different portions of the display, said data processing means also being capable of determining the values of the data input by a user into the digitizer in accordance with the keyboard configuration then displayed on the display.

6. A system for processing transactions, comprising:

a user input device which includes a display having a movable keyboard representation appearing thereon and a transparent digitizer positioned over the display for direct entry of data into the user input device by inputting to areas of the digitizer corresponding to depictions on said display of specific keys of said keyboard representation by a user;

a business terminal on which item transactions can be entered and recorded;

means for coupling said terminal to said user input device; and a controller operatively coupled to said terminal, to said display of said user input device, and to said digitizer of said user input device, said controller being capable of displaying any one of a plurality of selected keyboard configurations in any one of a plurality of different locations on said display, and including means for determining the values of data input by a user into the digitizer in accordance with a selected keyboard configuration location then displayed on the display, and means for transmitting said determined values of data to said terminal.

7. A process for providing keyboard data entry which is protected from detection by an unauthorized observer, comprising the following steps:

(a) providing a combined touch screen and display on which a chosen one of a plurality of depictions of keyboard representations may be displayed, with certain areas of the display representing certain keyboard values;

(b) providing a card reader by which data can be entered from a user's personal card to enable the user to over-ride the depiction of a keyboard representation provided;

(c) entering data from a user's personal card by said card reader to over-ride a provided keyboard configuration and replace it with a configuration selected by the user; and (d) entering data into the combined touch screen and display by contacting selected areas of the configuration on the combined touch screen and display on which data representations appear.

* * * * *